US012633869B2

(12) United States Patent
Bury

(10) Patent No.: US 12,633,869 B2
(45) Date of Patent: May 19, 2026

(54) CARPORT

(71) Applicant: BURY SP.Z.O.O., Mielec (PL)

(72) Inventor: Henryk Bury, Löhne (DE)

(73) Assignee: BURY SP.Z.O.O., Mielec (PL)

( * ) Notice: Subject to any disclaimer, the term of this patent is extended or adjusted under 35 U.S.C. 154(b) by 0 days.

(21) Appl. No.: 18/255,477

(22) PCT Filed: Dec. 6, 2021

(86) PCT No.: PCT/EP2021/084382
§ 371 (c)(1),
(2) Date: Jun. 19, 2023

(87) PCT Pub. No.: WO2022/122648
PCT Pub. Date: Jun. 16, 2022

(65) Prior Publication Data
US 2024/0097606 A1 Mar. 21, 2024

(30) Foreign Application Priority Data

Dec. 7, 2020 (DE) ..................... 10 2020 132 448.0

(51) Int. Cl.
*H02S 20/32* (2014.01)
*E04H 6/02* (2006.01)
(52) U.S. Cl.
CPC ............. *H02S 20/32* (2014.12); *E04H 6/025* (2013.01)
(58) Field of Classification Search
CPC .......... H02S 20/32; E04H 6/025; Y02E 10/50
See application file for complete search history.

(56) References Cited

U.S. PATENT DOCUMENTS

| | | | | |
|---|---|---|---|---|
| 9,739,505 B1 * | 8/2017 | Anich | ..................... | H02S 20/32 |
| 2012/0204934 A1 * | 8/2012 | Koningstein | ........... | H02S 20/32 |
| | | | | 136/246 |
| 2013/0118099 A1 * | 5/2013 | Scanlon | ................ | G01J 1/0228 |
| | | | | 136/246 |
| 2013/0234645 A1 | 9/2013 | Goei et al. | | |
| 2017/0318921 A1 * | 11/2017 | Gharabegian | ......... | F24S 30/452 |

FOREIGN PATENT DOCUMENTS

| | | | |
|---|---|---|---|
| DE | 20 2014 007 891 U1 | 12/2014 | |
| DE | 20 2016 105 226 U1 | 10/2016 | |
| ES | 2368544 A1 * | 11/2011 | ............... F24J 2/542 |
| FR | 2 960 286 A1 | 11/2011 | |
| JP | 2014-025288 A | 2/2014 | |

OTHER PUBLICATIONS

English machine translation of ES 2368544 A1 (Year: 2024).*

* cited by examiner

*Primary Examiner* — Angelo Trivisonno
(74) *Attorney, Agent, or Firm* — WCF IP

(57) ABSTRACT

The invention relates to a carport for a motor vehicle with a substructure and a superstructure, wherein the substructure has a multiplicity of supporting elements for fastening to a floor structure, and the supporting elements form a receiving space for a motor vehicle, wherein the substructure has a mounting structure which is arranged on the supporting elements, wherein the superstructure can be mounted on the mounting structure, wherein the superstructure has a base structure for fastening to the mounting structure and a carrier structure for fastening a photovoltaic cell. Here, the superstructure is mounted rotatably about at least one spatial axis.

17 Claims, 4 Drawing Sheets

3

1

9

8

10

7

2

6

CARPORT

Figure 1:
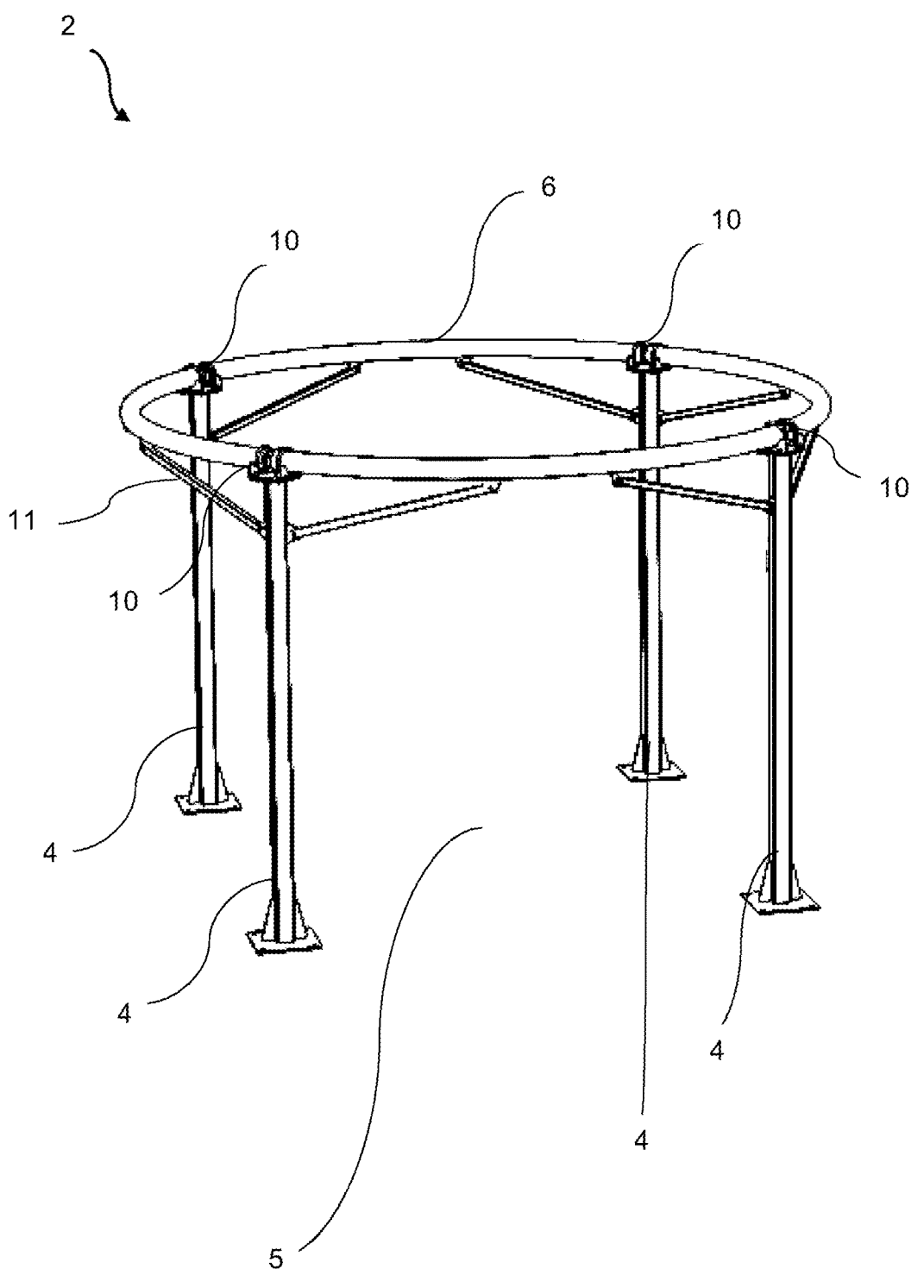

The invention relates to a carport for a motor vehicle with a substructure and a superstructure, wherein the substructure has a multiplicity of supporting elements for fastening to a floor structure, and the supporting elements form a receiving space for a motor vehicle, wherein the substructure has a mounting structure which is arranged on the supporting elements, wherein the superstructure can be mounted on the mounting structure, wherein the superstructure has a base structure for fastening to the mounting structure and a carrier structure for fastening photovoltaic cells.

Carports with photovoltaic cells for supplying an electrical consumer are known from the prior art. Carports of this type can have the disadvantage that these can be difficult to mount and the use of heavy tools may even be necessary. In addition, the substructure must already be aligned such that the photovoltaic cell arrangement in an optimal alignment ensures the most efficient possible power generation, since the cell arrangement can as a rule only be mounted precisely on the substructure.

Starting from this point, it is an object of the present invention to devise an improved carport that also permits the photovoltaic cells to be aligned independently before the alignment of the substructure.

The object is achieved with a carport having the features of claim 1. Advantageous embodiments are described in the sub-claims.

In the generic carport, it is proposed that the superstructure be rotatably mounted about at least one spatial axis.

The spatial axis can preferably be the axis which extends substantially orthogonally from the floor structure, which is to say in the direction of the longitudinal extent of the carport.

The superstructure can, for example, be mounted such that it can rotate in an angle of up to 360°. However, it is also conceivable that the superstructure is mounted such that it can rotate by more than 360° about the spatial axis. The superstructure can thus be rotated repeatedly about the spatial axis on the substructure.

A photovoltaic cell is an electrical component which converts radiation energy into electrical energy. A plurality of photovoltaic cells can be combined to form a module, wherein a plurality of modules forms an arrangement of photovoltaic cells.

As a result of the rotatable mounting of the superstructure about the spatial axis, the photovoltaic cells can be aligned to the position of the sun in such a way that efficient power generation or efficient conversion of the solar energy into electrical energy of the photovoltaic cells can be ensured.

Furthermore, the mounting of the carport can be made easier by the above-described construction. The superstructure can initially be attached to the mounting structure without any specific alignment. The superstructure can then be rotated in such a way that the photovoltaic cells are aligned according to the position of the sun. The superstructure can thus be attached to the substructure even before appropriate fine adjustment, wherein the superstructure can be moved into an optimum position by simple rotation about the spatial axis.

It is then conceivable but not necessary for the superstructure to be fixed to the mounting structure, so that an inadvertent change in the alignment of the photovoltaic cells is not possible without loosening the fixing. A fixing can be made, for example, via a type of hose clamp or a hose clamp mechanism.

The carrier structure can be displaceably mounted in the direction of the spatial axis for the adjustment of an angle of inclination of the photovoltaic cells. Also advantageously, the angle of inclination can be adjustable continuously or to at least two discrete positions.

The angle of inclination is the angle between a plane which is spanned by the photovoltaic cells and a plane which is spanned by the floor structure. For efficient operation of the photovoltaic cells, it is advantageous if the photovoltaic cells are aligned at a 90° angle relative to the solar irradiation.

The angle of inclination can be adjustable between 0° and 60°, in particular between 20° and 40°, depending on the location of the carport. In particular, the angle of inclination can be adjustable to two discrete positions, so that the angle of inclination in the summertime and in the wintertime is adjustable to the respective discrete position. The discrete position is the position in which the solar radiation at the sun's highest point strikes the photovoltaic cells at a 90° angle. The discrete position changes as a function of the sun's highest point, so that the angle of inclination is adjustable at least to two discrete positions, for example for the sun's highest position in the summertime and for the sun's highest position in the wintertime.

In particular, it is conceivable that the angle of inclination is adjustable automatically as a function of the calendar date. The angle of inclination can thus be tracked automatically, depending on the current date, wherein efficient operation of the photovoltaic cells can be ensured.

In this way, a carport with photovoltaic cells can be provided which can be aligned to the position of the sun both by the rotation about the spatial axis and also by the adjustment of the angle of inclination.

The angle of inclination can be adjustable, for example, via a lifting element.

The superstructure can be rotatable about the spatial axis in an angle of up to 90°.

By means of the rotation, the photovoltaic cells can be aligned to the position of the sun in a straightforward manner during the mounting of the carport. The photovoltaic cells can already be adjusted roughly to the position of the sun during the mounting. The superstructure can then be adjusted finely about the spatial axis by rotation in an angle of up to 90°, so that the photovoltaic cells are aligned appropriately to the sun's position. As a result of the reduction in the angle, the structure of the carport can also be simplified, so that only a rotation by up to 90° is necessary.

The mounting structure can be circular, wherein the superstructure is rotatably mounted about the spatial axis along the circular mounting structure.

As a result of the circular structure of the mounting structure, simple rotation of the superstructure along the mounting structure about the spatial axis can be achieved and, at the same time, a stable construction can be ensured.

The circular mounting structure is in particular designed in the form of a ring, wherein the entire superstructure is rotatably mounted about the spatial axis along a circular path of the annular mounting structure. Here, the circular path is to be understood as a continuous circular path and in particular not as a polygon which describes a circle. This has the advantage that the entire superstructure is rotatable about the spatial axis, in order to achieve simplified mounting of the superstructure on the substructure. It is conceivable that the superstructure can be rotated about the spatial axis by 360° as often as desired until the desired position on the substructure has been set.

The circular mounting structure can be formed from at least one cylindrical element. Further advantageously, the cylindrical element can form a ring structure, wherein the ring structure is designed to be connectable to the supporting elements via at least one connecting element.

The connecting elements can in particular be designed as a bearing bush, wherein the ring structure is mounted in the connecting elements formed as bearing bushes. By means of the connecting elements formed as a bearing bush, the supporting elements can be displaced along the ring structure of the mounting structure before the fastening to the floor structure, so that the supporting elements can be positioned at the mounting location and then fastened to the floor structure.

The mounting structure can also be designed as a ring structure, irrespective of the presence of the connecting element.

The base structure can be designed to be connectable to the ring structure by at least one further connecting element.

The further connecting element can in particular be of the same type as the connecting element between the ring structure and the supporting elements. The further connecting element can thus be designed in particular as a bearing bush, so that the superstructure is designed to be rotatable about the spatial axis in a straightforward manner by the ring structure being guided by the bearing bush.

Stabilizing elements for stabilizing the mounting structure and/or for stabilizing the carrier structure can be arranged on the substructure and/or on the superstructure. Further advantageously, the stabilizing elements can be designed so that they can be matched to the angle of inclination.

The carrier structure and/or the mounting structure is supported by the stabilizing elements, so that the carrier structure and/or the mounting structure is supported counter to the weight of the photovoltaic cells and/or of the entire superstructure. For example, it is conceivable that the stabilizing elements project from the supporting elements and are connected to the mounting structure, so that the weight can also be absorbed by the stabilizing elements.

The base structure can be four-cornered. This has the advantage that the photovoltaic cells can be mounted in a simplified manner on a four-cornered profile.

The base structure can be mounted on the mounting structure at mounting points, wherein the base structure is displaceably mounted on the mounting structure via wheels at the mounting points.

By means of the wheels, the superstructure can be displaced in a simplified manner on or along the mounting structure of the substructure, so that the alignment of the photovoltaic cells can be carried out in a simplified manner by the rotation of the superstructure.

It is also conceivable that, instead of the wheels, a sliding element such as, for example, a plastic slider can be used.

A charging element for charging an electric energy store can be arranged on the carport.

The superstructure can have a tracking system, wherein the tracking system is set up in such a way as to align the photovoltaic cell with the position of the sun.

The tracking system aligns the photovoltaic cell automatically in accordance with the current position of the sun, so that the superstructure experiences a continuous rotation and the sun's rays can strike the photovoltaic cell at an angle of about 90°, which is to say substantially orthogonally. In this way, the photovoltaic cell can be operated efficiently.

It is conceivable that, by means of the tracking system, the photovoltaic cell can be aligned rotatably about the spatial axis and displaceably in the direction of the spatial axis to adjust the angle of inclination to the position of the sun.

Furthermore, the present invention relates to a system having a multiplicity of the above-described carports, wherein the photovoltaic cells of the carports are connected to one another at a DC voltage level or are connected to one another at an AC voltage level via at least one interconnected inverter.

In principle, the photovoltaic cell delivers direct current to a connected load. Thus, a plurality of electric consumers can be supplied in parallel with electric power. If only one electric consumer is to be supplied, the output currents from a plurality of photovoltaic cells of the carport at the DC voltage level can be connected together either directly or via MPP-tracker-DC/DC converters, or via inverters as single-phase or three-phase power at an AC voltage level.

It is conceivable that the photovoltaic cells of a carport form a photovoltaic cell arrangement, wherein the photovoltaic cell arrangements of the carports are connected to one another at the DC voltage level or at the AC voltage level.

It is conceivable that the multiplicity of carports are connected to a single central inverter, and that the output currents from the photovoltaic cells are converted to three-phase power by the central inverter.

Thus, if required, a single electric power store can be charged more quickly by the energy from a plurality of carports than by the energy from one. However, there is also the possibility of supplying a plurality of electric consumers in parallel with power. In this way, the carport according to the invention can be used more flexibly.

The connection of a plurality of photovoltaic cells of the carports at a DC voltage level has the further advantage that fewer loss-affected voltage conversions arise.

The photovoltaic cells of the carports of the system can be connected to one another at the DC voltage level by a respective interconnected MPPT converter.

By means of the MPPT converter (Maximum Power Point Tracking), the greatest possible output can be taken from the photovoltaic cells and supplied to the system. In photovoltaic cells, the optimum operating point is not constant, since it fluctuates as a function of, for example, the temperature or irradiation intensity. By means of an MPPT converter connected downstream, the respective highest possible output can be taken from the photovoltaic cells and supplied to the system, so that no additional DC converter is necessary to adapt the different voltages to a same level.

Further advantageously, a DC converter for charging a vehicle with electric drive can be connected to an intermediate DC circuit of the inverter or the intermediate circuit voltage of the inverter can be adjusted such that it corresponds to the charging voltage for the vehicle with electric drive. As a result, the additional DC converter which would otherwise perform the voltage adaptation is dispensed with, the losses arising as a result being reduced.

By means of the intermediate circuit, a vehicle with electric drive can, for example, be charged directly at the intermediate circuit. The intermediate circuit voltage corresponds to the charging voltage of the vehicle with electric drive.

However, it is also conceivable that a DC converter is coupled to the intermediate circuit, wherein the DC converter converts the intermediate circuit voltage to the charging voltage of the vehicle with electric drive.

The inverter is used to feed excess electric energy into, for example, the general power network, besides the electrical energy which is expended for the charging of the vehicle with electric drive. Conversely, however, there is also the possibility of drawing electric power from the general power network, should the output from the photovoltaic cells not be sufficient to charge the vehicle with electric drive. Consequently, the inverter is set up to convert DC to AC and vice versa.

It is conceivable that the system according to the invention is also detached, which is to say independent of the above-described carport. The above-described system thus also functions only through a combination of a multiplicity of photovoltaic cells. A system without the direct application of an above-described carport can be described as follows:

A system having a multiplicity of photovoltaic cells, characterized in that the photovoltaic cells are connected to one another at a DC voltage level or at an AC voltage level via at least one interconnected inverter. The advantageous configurations correspond to the above-described embodiments with a carport.

Further advantageously, the system can be formed from a plurality of arrangements of photovoltaic cells.

The undetermined term "one" is to be understood as such and not as a numerical value. Thus, it is also conceivable that the substructure has, for example, a multiplicity of mounting structures, in particular two or four mounting structures, for the superstructure. In a corresponding way, the superstructure can have a multiplicity of base structures, in particular two or four base structures, for the mounting on the mounting structure or the mounting structures.

Figure 2:
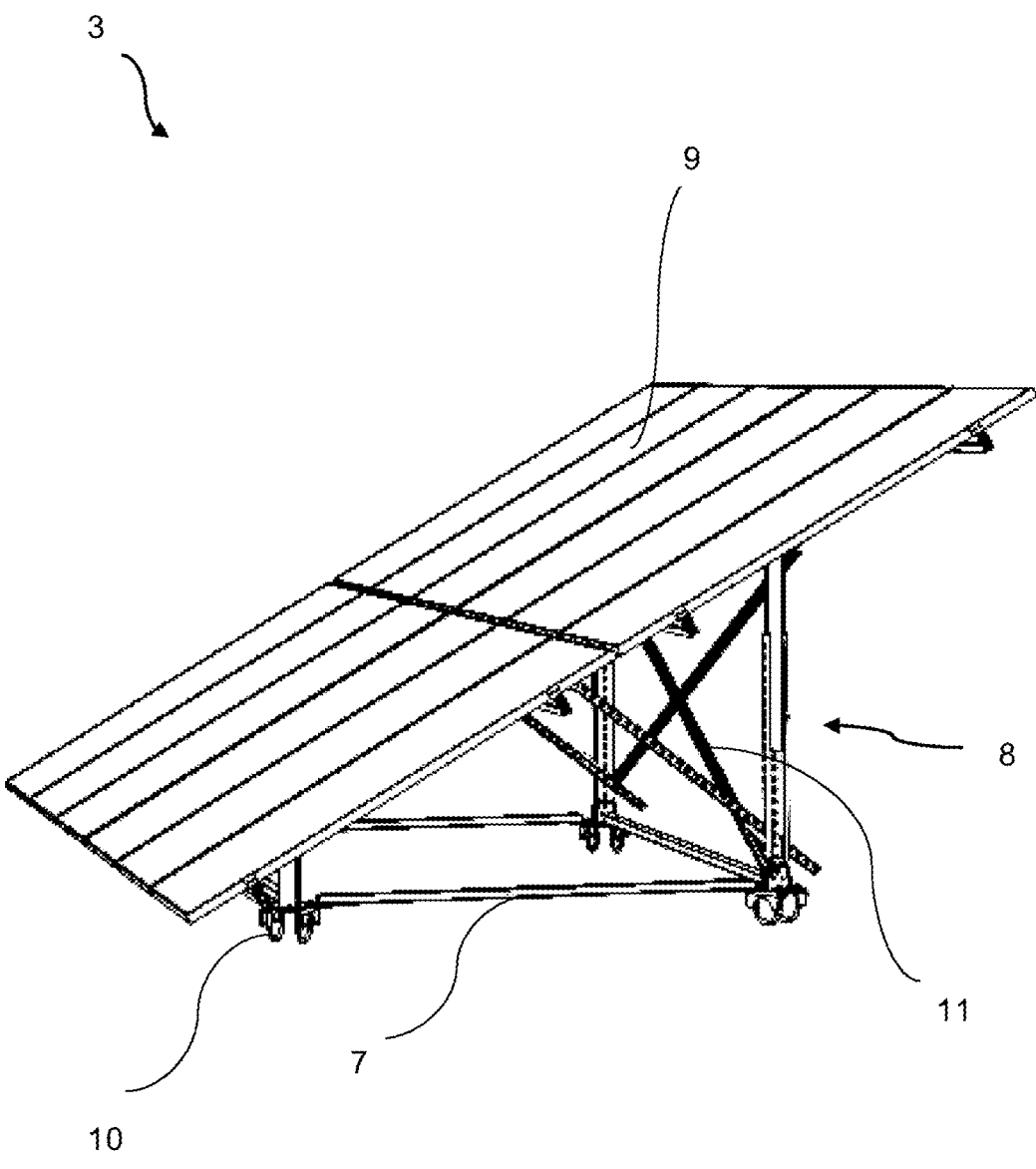
Figure 3:
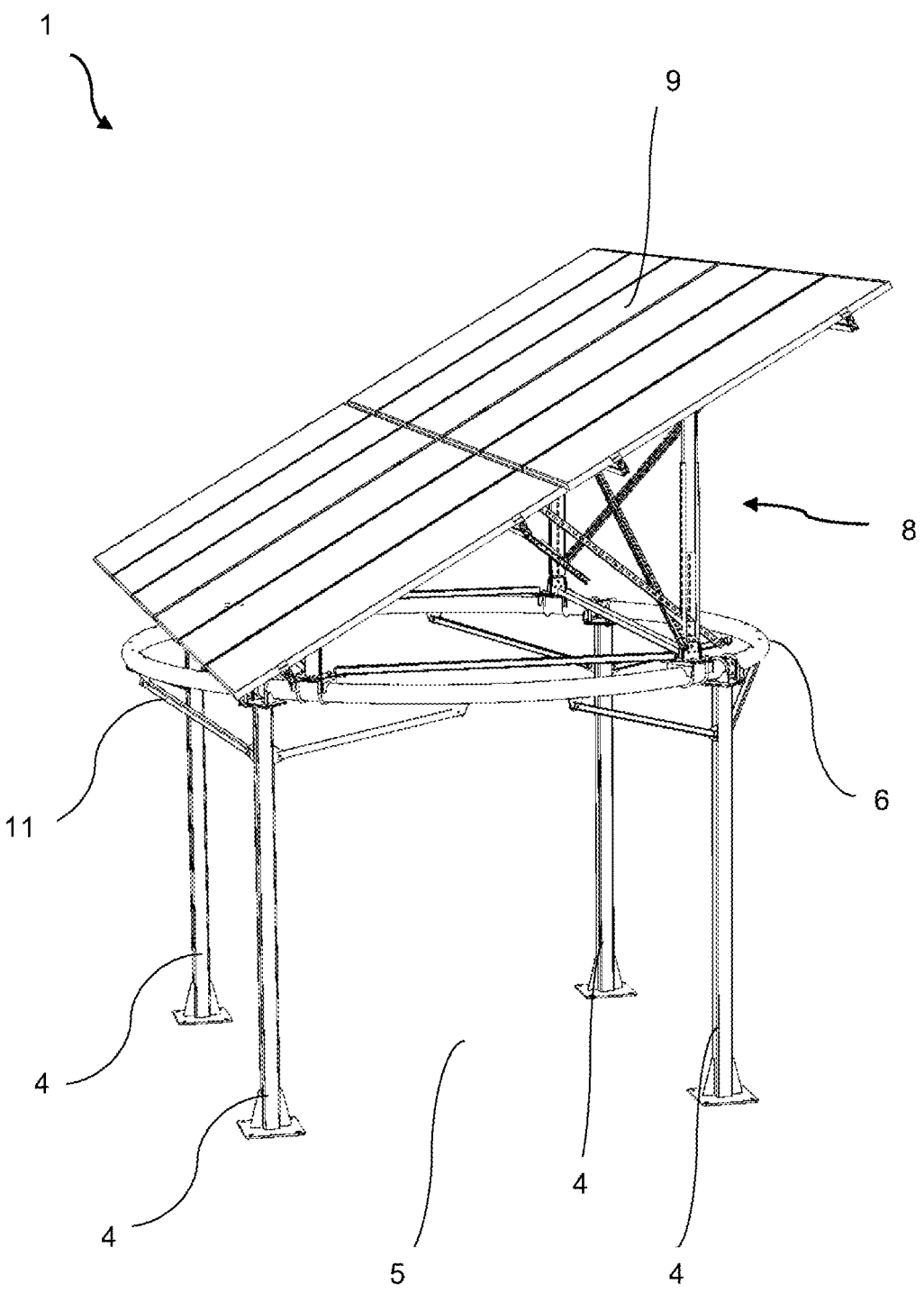
Figure 4:
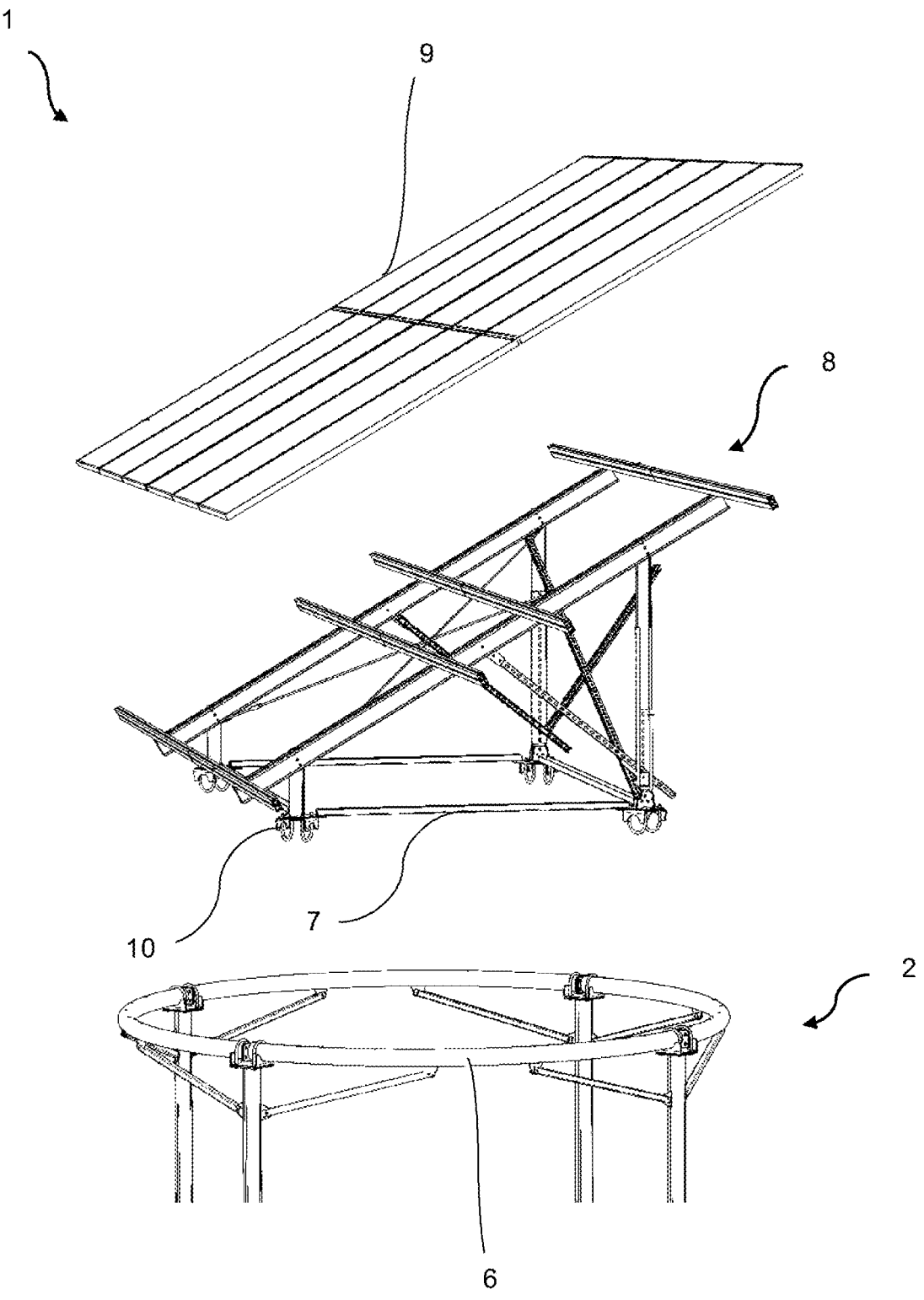

The invention will be explained in more detail below by way of example by using exemplary embodiments with the appended drawings, in which:

FIG. 1—shows a substructure of a carport according to the invention in a perspective view;

FIG. 2—shows a superstructure of a carport according to the invention in a perspective view;

FIG. 3—shows a carport according to the invention in a perspective view;

FIG. 4—shows a carport according to FIG. 3 in an exploded view.

FIG. 1 shows a substructure 2 of a carport according to the invention in a perspective view. The substructure 2 has four supporting elements 4, wherein the supporting elements 4 can be fastened to a floor structure by, for example, a screw connection. The supporting elements 4 form a receiving space 5, wherein the receiving space 5 is dimensioned for a motor vehicle such as, for example, a passenger car.

Arranged on the substructure 4 is a mounting structure 6, wherein in each case a supporting element 4 is connected to the mounting structure 6 via a connecting element 10. It becomes clear that the mounting structure 6 is circular. The circular mounting structure 6 is formed from a cylindrical element by the cylindrical element forming a ring structure.

The connecting elements 10 are designed as a bearing bush, wherein the ring structure is mounted in the connecting elements 10 designed as bearing bushes. By means of the connecting elements 10 designed as a bearing bush, supporting elements 4 can be displaced along the ring structure of the mounting structure 6 before the fastening to the floor structure. In this way, the supporting elements 4 can be positioned at the mounting location and then fastened to the floor structure. The connecting elements 10 may be U-bolts.

It can further be seen that the mounting structure 6 designed as a ring structure is stabilized by stabilizing elements 11, so that the mounting structure 6 is secured against sagging. In each case two stabilizing elements 11 project from a supporting element 4 and are connected to the mounting structure 6 at the diametrically opposite end.

FIG. 2 shows a superstructure 3 of a carport according to the invention in a perspective view. The superstructure 3 has a base structure 7, wherein the base structure 7 is designed as a rectangular profile. Arranged on the base structure 7 is a carrier structure 8, wherein the carrier structure 8 is configured for fastening photovoltaic cells 9. The carrier structure 8 is supported by stabilizing elements 11, so that the carrier structure 8 is supported against the weight of the photovoltaic cell 9.

It can further be seen that a connecting element 10 is arranged at each of the corners of the basic structure 7, wherein the connecting element 10 is designed as a bearing bush or as a sliding bearing. Via the connecting element 10, the base structure 7 can, for example, be mounted on a mounting structure 6 of the substructure 2 according to FIG. 1. The connecting element 10 may be a U-bolt.

The photovoltaic cells 9 are fastened to the carrier structure 8 at a specific angle of inclination. The angle of inclination is the angle between a plane which is spanned by the photovoltaic cells 9 and a plane which is spanned by the floor structure. For efficient operation of the photovoltaic cells 9 it is advantageous if the photovoltaic cells 9 are aligned at a 90° angle relative to the solar irradiation. This corresponds to an angle of inclination in Germany of between 30° and 75°; a high overall performance is achieved in particular between 30° and 40°, depending on the location of the carport.

FIG. 3 shows a carport 1 according to the invention in a perspective view with a substructure 2 according to FIG. 1 and a superstructure 3 according to FIG. 2. In addition, FIG. 4 shows the carport 1 according to FIG. 3 in an exploded view.

It becomes clear that the superstructure 3 having the base structure 7 is fastened to the annular mounting structure 6 of the substructure 2 via connecting elements 10. It also becomes clear that the superstructure 3 is rotatably mounted along the circular mounting structure 6 by the connecting elements 10 designed as bearing bushes or sliding bearings. The superstructure 3 is rotatably mounted along the circular mounting structure 6 about a spatial axis, wherein the spatial axis corresponds to the direction of extension of the carport 1 and the supporting elements 4. The spatial axis therefore projects substantially orthogonally from the floor structure.

It is conceivable that the superstructure 3 is rotatable about the spatial axis by 360°. However, a rotation by only 90° is also advantageous. In this way, the superstructure 3 can be arranged on the substructure 2, then aligned to optimal solar irradiation by rotation about the spatial axis and fixed to the mounting structure 6. Thus, the mounting of the carport 1 can be made easier in that the superstructure 3 can be mounted on the substructure 2 even before an appropriate fine adjustment and only has to be rotated into an optimal position.

LIST OF DESIGNATIONS

1 Carport
2 Substructure
3 Superstructure
4 Supporting element
5 Receiving space
6 Mounting structure
7 Base structure
8 Carrier structure
9 Photovoltaic cell
10 Connecting element
11 Stabilizing element

The invention claimed is:

1. A carport for a motor vehicle, comprising:

a substructure; and a superstructure comprising one or more connecting elements, wherein the substructure comprises a multiplicity of supporting elements for fastening to a floor structure, and the supporting elements form a receiving space for a motor vehicle, wherein the substructure has a circular mounting structure arranged on the supporting elements, wherein the superstructure is mountable on the circular mounting structure, wherein the superstructure comprises a base structure for fastening to the circular mounting structure, and a carrier structure for fastening photovoltaic cells, wherein the superstructure is rotatably mounted about at least one spatial axis on the circular mounting structure, wherein the circular mounting structure is formed from at least one cylindrical element, wherein the at least one cylindrical element forms a ring structure, and wherein the superstructure is rotatably attached to the circular mounting structure about the at least one spatial axis along the circular mounting structure by the one or more connecting elements, wherein the ring structure is mounted in the one or more connecting elements, wherein a first connecting element of the one or more connecting elements is configured for (i) attaching the superstructure to the circular mounting structure so that the superstructure is moveable by rotation about the spatial axis and (ii) fastening the superstructure to the circular mounting structure in an optimum position achieved by rotation of the superstructure about the spatial axis, so that an inadvertent change in alignment is not possible without loosening the first connecting element, said carport further comprising a charging element for charging an electric energy store of the motor vehicle parked in the carport.

2. The carport as claimed in claim 1, wherein the carrier structure is mounted displaceably in a direction of the at least one spatial axis for adjustment of an angle of inclination of the photovoltaic cells.

3. The carport as claimed in claim 2, wherein the angle of inclination is adjustable to at least two discrete positions.

4. The carport as claimed in claim 1 wherein the superstructure is rotatable about the at least one spatial axis in an angle of up to 90°.

5. The carport as claimed in claim 1 wherein the base structure is designed to be connectable to the ring structure by at least one further connecting element.

6. The carport as claimed in claim 1 further comprising stabilizing elements for stabilizing the mounting structure and/or for stabilizing the carrier structure, wherein the stabilizing elements are arranged on the substructure and/or on the superstructure.

7. The carport as claimed in claim 6 wherein the stabilizing elements are designed to be matchable to the angle of inclination.

8. The carport as claimed in claim 1 wherein the base structure is four-cornered.

9. The carport as claimed in claim 2 wherein the angle of inclination is adjustable via a lifting element.

10. The carport as claimed in claim 1 wherein the superstructure has a tracking system, wherein the tracking system is set up in such a way as to align the photovoltaic cells with a position of the sun.

11. A system having a multiplicity of carports as claimed in claim 1 wherein the photovoltaic cells of the multiplicity of carports are connected to one another at a DC voltage level or at an AC voltage level via at least one interconnected inverter.

12. The system as claimed in claim 11, wherein the photovoltaic cells of the multiplicity of carports are connected to one another at the DC voltage level by a respective interconnected MPPT converter.

13. The system as claimed in claim 12, wherein a DC converter for a vehicle with electric drive is connected to an intermediate circuit, or in that the intermediate circuit voltage corresponds to a requisite charging voltage for the vehicle with electric drive.

14. The carport of claim 1, wherein the first connecting element is a U-bolt.

15. The carport of claim 1, wherein the first connecting element comprises a through opening, wherein the first connecting element is configured to have a loosened state and a tightened state, wherein the ring structure is mounted in the first connecting element in both the loosened state and the tightened state such that the ring structure is irremovable from the through opening of the first connecting element in the tightened state and in the loosened state, wherein the first connecting element in the loosened state is configured to permit rotation of the superstructure relative the circular mounting structure, and wherein the first connecting element in the tightened state is configured to prevent rotation of the superstructure relative the circular mounting structure.

16. A carport for a motor vehicle, comprising:

a substructure, comprising supporting elements for fastening to a floor structure, and a ring structure arranged on the supporting elements, wherein the supporting elements form a receiving space for a motor vehicle;

a charging element for charging an electric energy store of the motor vehicle parked in the carport; and a superstructure, comprising at least one connecting element, a carrier structure for fastening photovoltaic cells, wherein the at least one connecting element comprises a through opening, wherein the at least one connecting element is configured to have a loosened state and a tightened state, wherein the ring structure is mounted in the at least one connecting element in both the loosened state and the tightened state such that the ring structure is irremovable from the through opening of the at least one connecting element in the tightened state and in the loosened state, wherein the at least one connecting element in the loosened state is configured to permit rotation of the superstructure relative the ring structure, and wherein the at least one connecting element in the tightened state is configured to prevent rotation of the superstructure relative the ring structure.

17. A method of assembling the carport of claim 16, the method comprising

9

10 attaching the superstructure to the ring structure without special alignment so that the ring structure is irremovable from a through opening of the at least one connecting element;

aligning the photovoltaic cells according to a position of the sun by rotating the superstructure around at least one spatial axis of the substructure such that the at least one connecting element is positioned at a different circumferential position of the ring structure; and fastening the superstructure to the ring structure so that an inadvertent change in alignment is not possible without loosening the at least one connecting element.

* * * * *